UNITED STATES PATENT OFFICE.

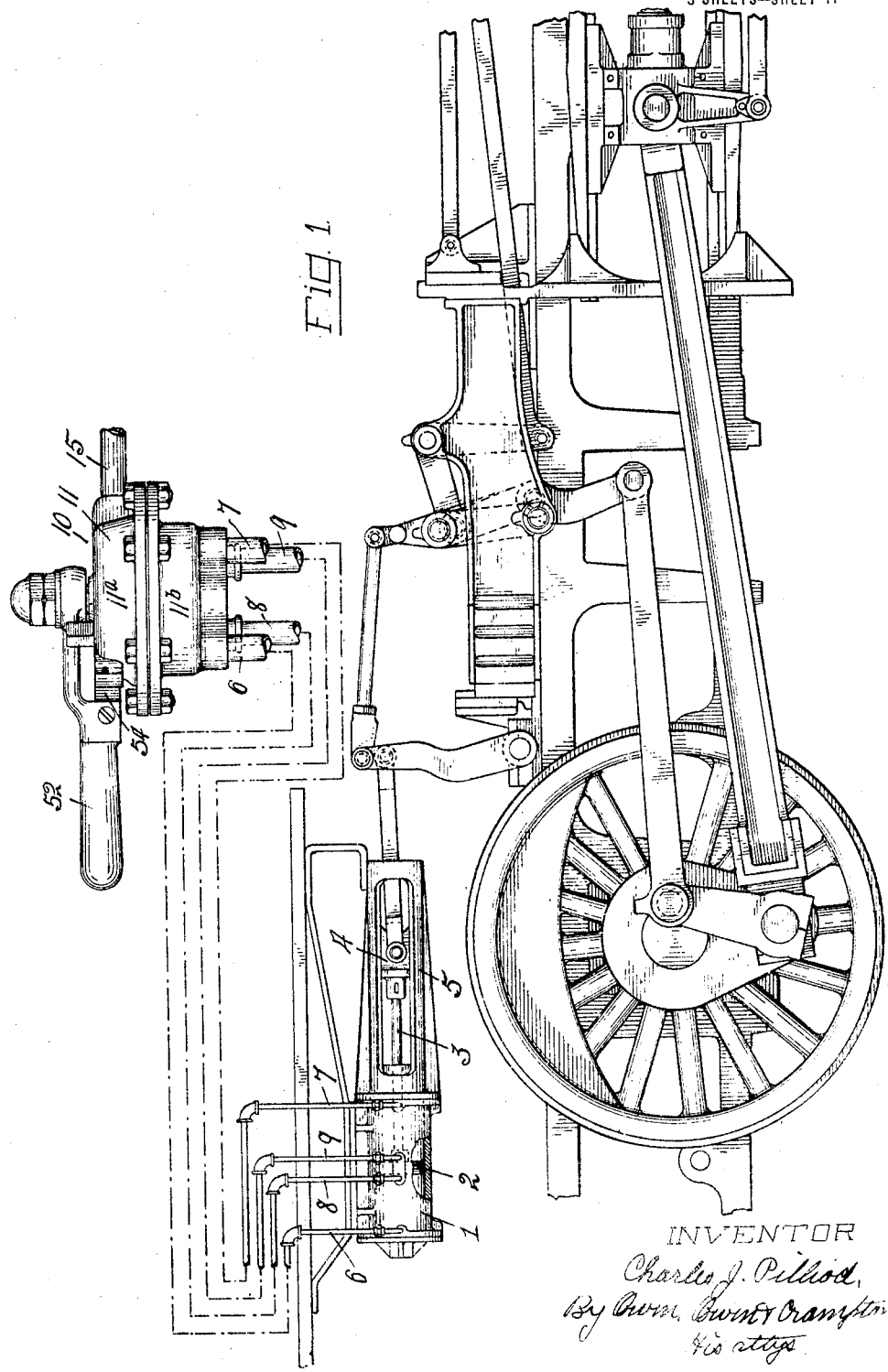

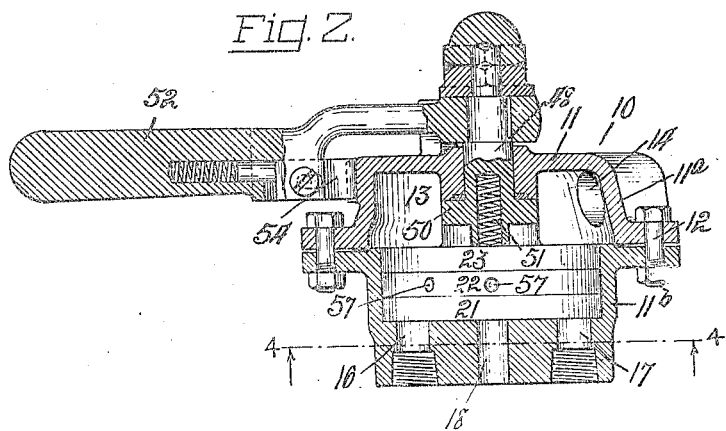
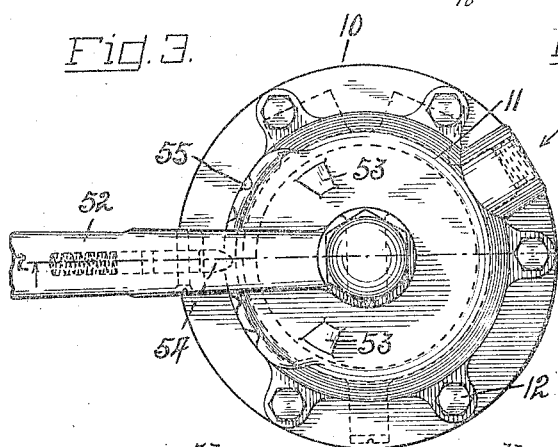
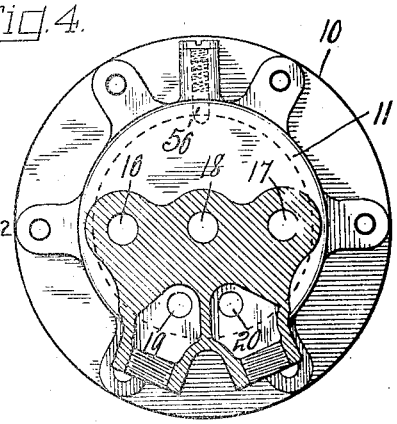
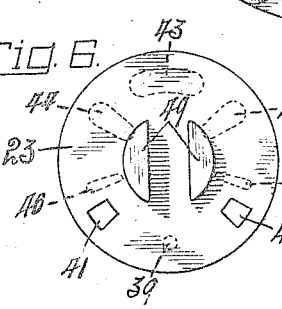
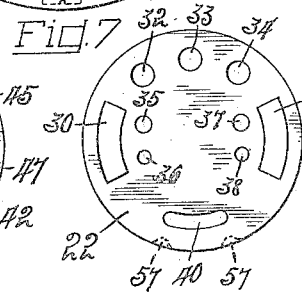
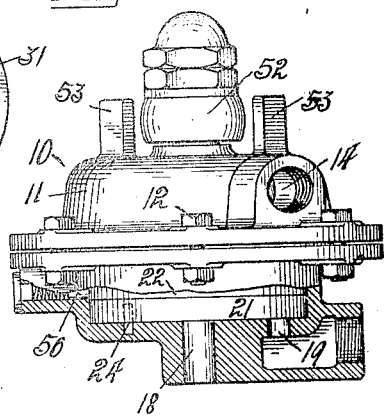

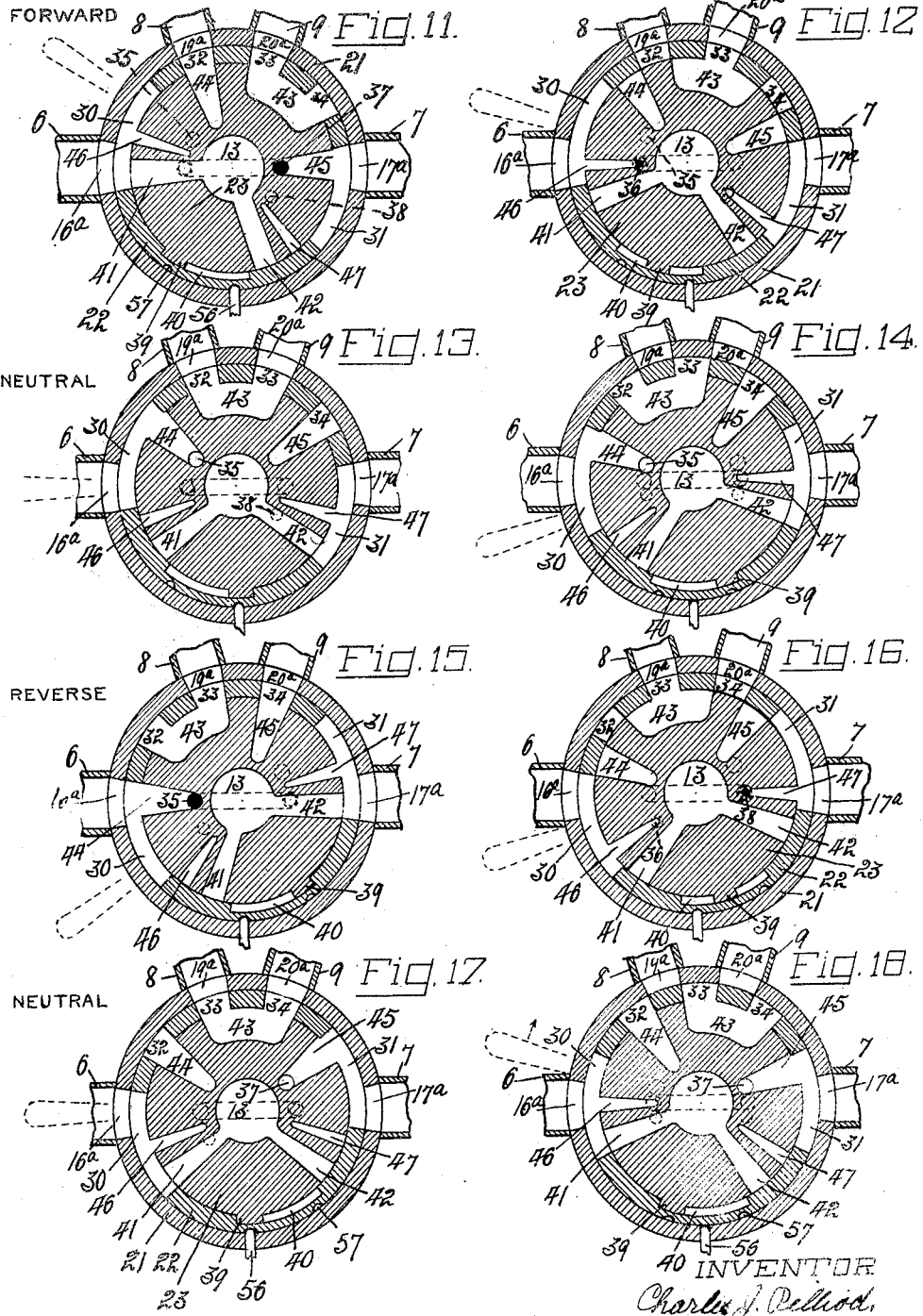

CHARLES J. PILLIOD, OF TOLEDO, OHIO, ASSIGNOR TO DANIEL SEARLES, TRUSTEE, OF TOLEDO, OHIO.

FLUID-PRESSURE CONTROL.

1,382,119.  Specification of Letters Patent.  Patented June 21, 1921.

Application filed December 18, 1917. Serial No. 207,704.

*To all whom it may concern:*

Be it known that I, CHARLES J. PILLIOD, a citizen of the United States, and a resident of Toledo, in the county of Lucas and State of Ohio, have invented a certain new and useful Fluid-Pressure Control; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to fluid pressure control means, and particularly to a reverse control for the valve-gears or valves of locomotive engines or the like.

The primary object of my invention is the provision of an improved fluid pressure control for the valve-gears or inlet and exhaust valves of fluid pressure engines, such, for instance, as used in connection with locomotives and tractors, and also for use in connection with marine and stationary engines in which reversing conditions are required, whereby to facilitate the handling and to enhance the practicability and commercial value thereof. Other objects and advantages of the invention will be apparent from the following detailed description thereof.

While the invention, in its broader aspect, is capable of embodiment in numerous forms and of use in numerous connections, an embodiment thereof in connection with a reversible engine and with a gear of the Baker type is illustrated in the accompanying drawings, in which—

Figure 1 is a side view of one embodiment of the invention, with parts broken away and diagrammatically connected, and with the invention connected to a locomotive valve-gear. Fig. 2 is a central vertical section of the control-valve. Fig. 3 is a top plan view thereof with a portion of the handle portion broken away. Fig. 4 is a section on the line 4—4 in Fig. 2. Fig. 5 is a side elevation with a portion broken away. Figs. 6, 7 and 8 are top plan views, respectively, of the top, intermediate and bottom valve-disks or plates. Fig. 9 is a section on the line 9—9 in Fig. 8. Fig. 10 is a side view of the top valve-disk or plate, with a part broken away, and Figs. 11 to 18 are diagrammatical views of the valve in different positions of adjustment.

Referring to the drawings, 1 designates a closed cylinder in which a piston 2 is mounted for reciprocatory movements and has its stem 3 projected out through an end of said cylinder and connected, in the present instance, to a cross-head 4 operating in a guide 5. If associated with a valve-gear of the reverse type, the cross-head 4 is connected therewith in any suitable manner, as well understood in the art, and as illustrated in Fig. 1.

A pipe 6 is in communication with one end, and a pipe 7 is in communication with the other end of the cylinder, and these pipes each alternately serve as fluid pressure inlet and exhaust pipes. A pair of equalizing pipes 8 and 9 communicate with the interior of the cylinder 1 adjacent to its longitudinal center and in spaced relation longitudinally of the center with the space between the cylinder openings thereof slightly greater than the thickness of the piston 2. It is thus evident that when the piston is positioned between the cylinder openings of the equalizing pipes, such openings have communication with the cylinder at the respective sides of the piston, as shown in Fig. 1.

The valve employed for controlling the inlet and exhaust of fluid through the pipes 6 and 7 and the opening and closing of the communication between the equalizing pipes 8 and 9 may be located at any convenient point of access and is designated 10.

This control-valve, in the present instance, embodies a case 11 composed of the two sections 11$^a$ and 11$^b$ secured together in sealed relation by bolts 12 and forming a chamber 13. A fluid inlet opening 14 is provided in the section 11$^a$ in communication with the upper portion of the chamber 13 and has a supply-pipe 15 threaded therein. The lower section 11$^b$ of the case is provided through its bottom with an opening 16 with which the pipe 6 communicates, an opening 17 with which the pipe 7 communicates, and an exhaust opening 18, with the exhaust opening at the center and the openings 16 and 17 in diametrically opposed relation thereto as shown in Figs. 2 and 4. The openings 16 and 17 may be termed working openings or passages to distinguish them from the inlet passage 14. The case bottom is also provided with two ports 19 and 20, the outer ends of which are enlarged, as shown in Fig. 4, and have the ends of the pipes 8 and 9, respectively, connected therewith.

The portion of the chamber 13, which is formed within the case-section 11$^b$ is of cylindrical form and receives three superposed disks or cylindrical plates 21, 22 and 23, which seat closely one upon another and fit said cylindrical portion of the chamber 13 in which mounted. The bottom plate 21 is anchored against rotary movements within the case by a dowel 24 projecting downward therefrom into a registering socket in the case bottom, or it may be secured against turning in any other suitable manner. Working ports 16$^a$ and 17$^a$, preferably of short segmental form, are provided in the bottom disk 21 in permanent register with the case-ports or openings 16 and 17, respectively, and this disk is also provided with ports 19$^a$ and 20$^a$ in permanent register with the respective case-ports 19 and 20. This disk is also provided with ports 27 and 28 intermediate the ports 16$^a$ and 17$^a$ and on a diametrical line therewith but at opposite sides of the disk-center in equidistantly spaced relation thereto, and such ports have comunication with each other and with the exhaust port 18 in the case through a bottom channel 29 in the disk 21. So far as the operation of the valve is concerned, the disk 21 might be integral with and form a part of the case bottom, as will be apparent from the subsequent description.

The intermediate disk 22 is provided adjacent to its outer edge with diametrically opposed segmental working ports 30 and 31, which are of the same length, and are longer than and positioned to register respectively with, the ports 16$^a$ and 17$^a$ during a predetermined portion of a relative rotary movement of the disks 21 and 22. The disk 22 is also provided between the ports 30 and 31 in circular series with the ports 32, 33 and 34, which are equidistantly spaced with relation to each other and to the ports 30 and 31. This disk is also provided at the inner side of the port 30 with the two ports 35 and 36 and at the inner side of the port 31 with the two ports 37 and 38, which are disposed in a circle struck from the center of the disk. The ports 36 and 38 are preferably smaller than the ports 35 and 37, as shown.

The top disk 23 has a pin 39 projecting from its under side into a segmental slot 40 in the disk 22 to adapt the disk 23 to have limited rotary movements relative to the disk 22 and also to move the disk 22 therewith during portions of its movement. The slot 40 is disposed, in the present instance, in substantially diametrically opposed relation to the port 33. The disk 23 is provided with ports 41 and 42 therethrough, which are shorter than, and adapted to respectively register with, the ports 30 and 31 during different portions of the relative movements of the disks 22 and 23. For this purpose the ports 41 and 42, in the present instance, are disposed substantially 90° apart, or in position so that both may be out of register with the ports 30 and 31 at the sides thereof opposed to the ports 32, 33 and 34, or either, but not both, may be moved into register with its respective port 30 or 31 in the disk 22, as desired. The disk 23 is provided on its under side with a segmental channel 43, which is intended to register with and open communication between the ports 32 and 33 in the disk 22 when the port 42 is in register with the port 31 and the disks are in the relative positions shown in Fig. 13, and to register with and open communication between the ports 33 and 34 when the port 41 is in register with the port 30 as shown in Fig. 17. The disk 23 is also provided on its under side with the radial channels 44 and 45, disposed adjacent to opposite ends of the channel 43, and with radial channels 46 and 47, disposed adjacent to and at the outer sides of the respective ports 41 and 42.

When the ports 30 and 41 are out of register and the ports 31 and 42 are in register, the channel 44 opens communication between the port 30 and the exhaust port 35, which is then in register with the exhaust port 27 in the bottom disk, as illustrated diagrammatically in Fig. 11. The reverse is true of the channel 45, which is intended to register with and open communication between the ports 31 and 37 when the ports 30 and 41 are in register and the port 37 is in register with the exhaust port 28 in the bottom plate, as illustrated diagrammatically in Fig. 15. The channel 46 is intended to register with and open exhaust communication between the ports 30 and 36 when the latter is in register with the exhaust port 27 in the bottom disk and the disk 23 is in, what may be termed, neutral or midway position relative to the disk 22, and when said latter disk is at the limit of its rotary movement to the right, as diagrammatically illustrated in Fig. 16. On the other hand, the channel 47 is intended to open exhaust communication between the port 31 and exhaust port 38, which latter is in communication with the exhaust port 28 in the bottom disk 21 when the disk 23 is in neutral or midway position relative to the disk 22 and said latter disk is at the extreme of its movement to the left, as diagrammatically illustrated in Fig. 12.

A shaft 48 is journaled centrally through the top of the case 11 and has its inner end forming a key which fits between a pair of diametrically opposed studs 49 on the top of the disk 23 to effect a turning of the disk and shaft in unison. The shaft is provided adjacent to its inner end with a shoulder 50 which has a fluid-tight seat against the inner end of the case bearing in which the shaft is mounted. A coiled compression spring 51 is mounted in an axial socket in the inner end of the shaft 48 and has its opposite ends thrust against the disk 23 and the bottom of said sockets both to hold the disk 23 closely seated on the disk 22 and to maintain a tight joint between the shoulder 50 and case. A control-handle 52 is fixed to the outer end of the shaft 48 and projects radially therefrom and between a side of the case 11. The swinging movement of the handle 52 relative to the case 11 is limited by a pair of stop-lugs 53, 53 on the case top and between which the handle moves. The control-handle is yieldingly held in neutral or in one or the other of its extreme positions of movement by a spring-pressed detent 54, that is carried by the handle and engages within a registering one of a series of sockets 55 in the adjacent edge of the case (Figs. 2 and 3). The disk 22 is yieldingly held at one or the other of its extreme positions of movement by a spring-pressed detent 56 in one side of the case engaging a registering one of a pair of sockets 57 in the adjacent side edge of said disk.

The operation of my piston control means, with reference more particularly to its use in connection with the reverse means of a fluid pressure engine, is as follows: For forward running, the control-piston 2 is at the forward end of its cylinder, and to obtain and maintain this position the operator throws the handle 52 of the control-valve 10, in the present instance, to the extreme left, in which position both the rotary valve-disks 22 and 23 are at the limit of their respective movements to the left, as indicated in Fig. 11. With the valve-disks in this position the live fluid pressure chamber 13 in the upper portion of the valve-case is in communication with the pipe 6 through the valve-ports 41, 30 and 16$^a$, thus admitting fluid under pressure to the rear end of the cylinder 2. At the same time the pipe 7, which is in communication with the forward end of the cylinder, is open to the valve exhaust passage 18 through the registering ports 17$^a$ and 31, channel 45 and exhaust ports 37, 28 and 29. In this position the communication between the equalizing pipes 8 and 9 is closed. To reverse the direction of running of the engine the control-handle 52 is thrown to the extreme right, in which position both the rotary valve-disks 22 and 23 are at the limit of their respective movements to the right, as indicated in Fig. 15. In this position of the valve-disks the condition is the reverse to that for forward running, the ports 42, 31 and 17$^a$ then being in register to open communication between the fluid supply line and the forward end of the cylinder through the pipe 7, and the ports 16$^a$ and 30, channel 40 and exhaust ports 35, 27 and 29 being in register to open communication between the valve exhaust passage 18 and the rear end of the cylinder. Should the valve be set for forward running and it be desired to stop the engine and to place the valve in what may be termed safety or neutral position, the operator first throws the control-lever from the forward running position, indicated in Fig. 11, to the position indicated in Fig. 12, which position is determined by the detent 54 engaging in the second notch 55 in the series from left to right, and permits the handle to rest momentarily in this position. During this movement of the handle the upper valve-disk 23 is caused to move substantially half of its permissible movement relative to the disk 22, which movement is not sufficient to place the ports 42 and 31 in register and does not disturb the forward running position of the disk 22, which is yieldingly maintained by the engagement of the detent 56 with the right-hand notch 57 therein. With the valve in this position (Fig. 12) the pressure supply to the rear end of the cylinder is cut off by reason of the port 41 in the disk 23 having moved out of register with the port 30 in the disk 22, and such end of the cylinder is opened to the exhaust passage 18 by reason of the channel 46 in the disk 23 opening communication between the port 30 and small exhaust port 36 in the disk 22, which latter port is then in communication with the exhaust port 27, 29 in the disk 21, thus releasing a portion of the pressure from the rear side of the piston. The handle is then thrown to its midway or safety position indicated in Fig. 13, which moves the top disk 23 to the limit of its movement to the right relative to the disk 22, but does not disturb the forward running position of said latter disk, and throws the channel 46 out of register with the exhaust port 36 and the supply port 42 in register with the port 31, thus admitting fluid under pressure to the forward end of the cylinder. Such admission of pressure to the forward end of the cylinder moves the piston to the rear, thereby compressing the fluid which remains back of the piston at the rear end of the cylinder. This compressing action causes a retarding of the rearward movement of the piston so that when it has moved between the cylinder and communicating ends of the equalizing pipes 8 and 9 the pressure, in both ends of the cylinder is equalized, due to the channel 43 in the disk 23 standing in register with and opening communication between the ports 32 and 33 in the disk 22, which are respectively in register with the pipes 8 and 9 through the ports 19$^a$ and 20$^a$ in the disk 21. In bringing the engine to rest from reverse running, the valve is moved from the reverse running position, shown in Fig. 15, to the neutral or safety position, shown in Fig. 17, in the same manner as above described, except that the movement of the handle is in the reverse direction. That is to say, the operator first moves the handle to the left to the position shown in Fig. 16, which position is determined by the detent 54 entering the second notch 55 in the series from right to left and in which position both ends of the cylinder are closed to the source of fluid pressure supply, and the pressure in the forward end of the cylinder is permitted to partially exhaust therefrom in a slow manner by reason of the channel 47 registering with the port 31 and small exhaust port 38 in the disk 22, which latter port is then in communication with the valve exhaust passage. After a momentary resting of the control-handle at this slow exhausting position it is moved to neutral or safety position, as indicated in Fig. 17, in which position the rear end of the cylinder is in communication with the source of fluid pressure supply, due to the supply-port 41 in the disk 23 registering with the port 30 in the disk 22, and the equalizing pipes 8 and 9 are in communication, due to the channel 43 standing in register with the ports 33 and 34 in the disk 22, which ports in turn register with the ports 19$^a$ and 20$^a$ of the disk 21. It is thus apparent that upon the retarded movement of the piston toward the forward end of the cylinder it is arrested between the cylinder communicating ends of the pipes 8 and 9, due to the equalizing of the pressure at opposite sides of the piston which takes place through said pipes. The diagrams illustrated in Figs. 14 and 18 are not material except that they show both rotatable valve-disks 22 and 23 turning together in the same direction, the former toward reverse running position and the latter toward forward running position.

The purpose of equalizing the pressure at opposite sides of the piston when the valve-handle is in neutral position is to take care of or compensate for any leakage which may occur between either end of the cylinder and the source of fluid pressure supply when the engine is at rest and thereby prevent a gradual movement of the piston toward the opposite end of the cylinder from that in which the leakage occurs and into reverse or forward running position, as the case may be. It is thus evident that the control-valve, when in such neutral position, acts as a safety for preventing a starting of the engine by reason of such leakage, which starting sometimes occurs with the present forms of control when the engine is left unattended.

I wish it understood that my invention is not limited to any specific construction, form or arrangement of the parts, or to the form and arrangement of the ports and passages, as numerous changes may be made without departing from the spirit of the claims.

Having thus described my invention, what I claim as new, and desire to secure by Letters Patent, is—

1. In a control of the class described, a valve case having a fluid pressure supply inlet; a pair of working passages, and an exhaust passage; two movable disk valve members one working over the other and mechanically connected together so as to have a limited relative rotary and predetermined movement, each valve member provided with a plurality of passages, said members being operable to cause predetermined relations of these passages and to register to open one of said working passages to said supply inlet, and the other to said exhaust passages and vice versa; and a control means connected to one of said disk valve members, for directly operating both of said valve disk members.

2. In a control of the class described, a casing having forward and reverse outlet ports, an exhaust port, and an inlet port, a movable valve member having forward and reverse outlet ports in constant communication with the outlet ports of the casing and a pair of associated exhaust ports selectively connectible with the exhaust port of the casing for forward and reverse running; and a second movable valve member interposed between the casing inlet port and the first valve member and provided with forward and reverse ports alternately connectible with the respective corresponding ports of the first valve member, and exhaust passages for connecting the inoperative outlet port of the first valve member to its associated exhaust port; said first valve member being movable to connect its exhaust ports selectively with the exhaust port of the casing for forward and reverse running.

3. In a control of the class described, a casing having forward and reverse outlet ports, an exhaust port, and an inlet port, a movable valve member having forward and reverse outlet ports in constant communication with the outlet ports of the casing and a pair of associated exhaust ports selectively connectible with the exhaust port of the casing for forward and reverse running; and a second movable valve member interposed between the casing inlet port and the first valve member and provided with forward and reverse ports alternately connectible with the respective corresponding ports of the first valve member, and exhaust passages for connecting the inoperative outlet port of the first valve member to its associated exhaust port; and means for mechanically connecting the second valve member to the first valve member for a limited movement whereby the latter may be moved by the second valve member from one running position to the other and the said second valve member then be operated in an independent manner to connect the proper ports provided for the particular running position.

4. In a control of the class described, a casing having forward and reverse working ports, an exhaust port, a pair of equalizing ports, and a spaced inlet port; a valve member provided with working ports, in constant communication with the corresponding ports of the casing, forward and reverse equalizing ports selectively connectible with the equalizing ports of the casing, and a pair of exhaust ports one associated with each working port and selectively connectible to the casing exhaust port, said valve member being movable from a forward running position to a reverse running position and vice versa, the inoperative ports of those selectively connectible being brought into operation upon movement of the valve member from one running position to another; and a second valve member interposed between the first valve member and the casing inlet port and provided with forward and reverse working ports selectively connectible with the working ports of the first valve member, a passage for selectively connecting the equalizing ports of the first valve member in pairs with the casing equalizing ports, and a pair of exhaust passages for connecting the inoperative working port of the first valve member to the associated exhaust port.

5. In a control of the class described, a casing having forward and reverse working ports, an exhaust port, a pair of equalizing ports, and a spaced inlet port; a valve member provided with working ports, in constant communication with the corresponding ports of the casing, forward and reverse equalizing ports selectively connectible with the equalizing ports of the casing, a pair of pressure-release ports, and a pair of exhaust ports one associated with each working port and pressure-release port, said exhaust and pressure-release ports being selectively connectible to the casing exhaust port, the pressure-release ports becoming operative in advance of the respective exhaust ports, said valve member being movable from a forward running position to a reverse running position and vice versa, the inoperative ports of those selectively connectible being brought into operation upon movement of the valve member from one running position to another; and a second valve member interposed between the first valve member and the casing inlet port and provided with forward and reverse working ports selectively connectible with the working ports of the first valve member, a passage for selectively connecting the equalizing ports of the first valve member in pairs with the casing equalizing ports, a pair of exhaust passages for connecting the inoperative working port of the first valve member to the associated exhaust port, and a pair of pressure-release passages one associated with each exhaust passage and arranged in advance thereof for connecting the inoperative working port of the first valve member to the associated exhaust port, said pressure-release passages being smaller than the exhaust passages.

6. In a control of the class described, a casing having an exhaust port and a pair of working ports; a valve member movable from forward to reverse running position and vice versa and provided with working and associated exhaust ports for communication with those of the casing, certain of the valve ports being provided for forward running and certain for reverse running; and a second valve member mechanically connected to the first valve member for limited movement to shift the latter from one running position to the other, said second valve member having forward and reverse sets of passages, each set including a working port, a pressure-release passage for connecting the inoperative working port of the first valve member to the associated exhaust port thereof.

In testimony whereof I have hereunto signed my name to this specification.

CHARLES J. PILLIOD.